United States Patent

[11] 3,597,669

[72] Inventor Daniel J. Soltz
  Norristown, Pa.
[21] Appl. No. 33,181
[22] Filed Apr. 30, 1970
[45] Patented Aug. 3, 1971
[73] Assignee Eaton Yale & Towne Inc.,
  Cleveland, Ohio

[54] ELECTRICAL BRAKING SYSTEM FOR ELECTRIC MOTOR-DRIVEN VEHICLES
19 Claims, 4 Drawing Figs.

[52] U.S. Cl. .................................................. 318/17,
  187/9, 318/258, 318/371, 318/373
[51] Int. Cl. ........................................................ H02k 17/14
[50] Field of Search ........................................... 318/17,
  258, 366, 373, 379, 364, 393, 371; 187/9; 182/84

[56] References Cited
UNITED STATES PATENTS

| | | | |
|---|---|---|---|
| 3,213,343 | 10/1965 | Sheheen ....................... | 318/373 |
| 3,297,930 | 1/1967 | Payne ........................... | 318/269 |
| 3,335,351 | 8/1967 | Morris .......................... | 318/373 |
| 3,344,328 | 9/1967 | Morris .......................... | 318/269 |
| 3,463,991 | 8/1969 | Yuminaka et al. ............. | 318/258 |

*Primary Examiner*—Oris L. Rader
*Assistant Examiner*—K. L. Crosson
*Attorney*—Yount and Tarolli ABSTRACT: An electrical braking system is provided for a vehicle driven by an electric motor, having a field winding arranged so that the vehicle is driven in a direction in accordance with the direction of direct current flowing through the filed winding. The system, which is adapted to be carried by such a vehicle, includes a movable brake member adapted to be mounted to the vehicle for movement between a normal first position and a second position. Circuit means, which may include a variable resistor, serves to vary the amount of direct current applied to the field winding in dependence upon the relative position of the brake member between the first and second positions. An electrical sensing circuit is utilized to sense whether the vehicle is traveling in a forward or reverse direction. A current direction control circuit serves to control the direction of direct current through the field winding so as to flow in a direction opposite to that required for driving a vehicle in the sensed direction. In this manner, the electrical motor is electrically braked to thereby retard motion of the vehicle in the sensed direction substantially in proportion to the relative position of the brake member.

INVENTOR
DANIEL J. SOLTZ
BY Yount and Tarolli
ATTORNEYS

INVENTOR
DANIEL J. SOLTZ

BY Yown and Tarolli
ATTORNEYS

ELECTRICAL BRAKING SYSTEM FOR ELECTRIC MOTOR-DRIVEN VEHICLES

This invention is related to the art of braking and, more particularly, to a system for electrically braking electric-powered vehicles, such as industrial lift trucks or order pickers.

The invention is particularly applicable in conjunction with electrically powered order pickers, lift trucks, or the like; however, it will be appreciated that the invention has broader applications and may be used in conjunction with electrically braking various types of electric motor powered vehicles.

Industrial vehicles, such as lift trucks and order pickers, are frequently driven by electric motors. Such vehicles may be mechanically braked or electrically braked, or a combination of both. Typically, the mechanical braking action is an on-off operation; to wit, a brake member is spring biased into braking engagement with one of the vehicle's wheels and when released, as with a solenoid, the vehicle's wheel is free to be driven by the motor. Electrical brakes are also on-off brakes, and normally involve dynamic braking by plugging the field coil of the driving motor; to wit, applying full rated direct current to the field winding in a direction opposite to that required for driving the vehicle in the direction it is traveling when the electric brake is actuated. Consequently, both mechanical and electrical on-off brakes provide abrupt braking forces.

An order picker is generally similar to a lift truck in that it includes a lift which is adjustably movable in a vertical direction between a lower floor position and an upper position. In an order picker, however, an operator's compartment is located on the lift itself, together with controls for controlling the vehicle's speed and direction, as well as the vertical position of the lift. Consequently, the operator may drive the vehicle to a desired location and, without leaving the operator's compartment, operate the lift controls to a particular height to fill an order from an elevated bin. If the vehicle is driven while the lift is in a raised position, then it is desirable that the vehicle be provided with a braking system that provides a smooth rate of deceleration. The typical on-off electrical and mechanical brakes provide abrupt rates of deceleration. If a mechanical service brake be devised for the vehicle to obtain a smooth deceleration, the brake would require complex mechanical linkages extending between the lift and the vehicle's wheels to permit braking operation at various positions of the lift.

The present invention provides electrical circuitry for reversing the flow of direct current to the field winding of an electric motor in such a vehicle to obtain dynamic braking. So that the braking action is smooth and not abrupt, reverse current is varied in accordance with the position of a brake member. With this invention, the electrical braking circuitry utilizes much of the components normally required to drive the vehicle; to wit, a direct current power source, pulse control circuitry, motor field windings and field winding reversing circuitry.

The present invention contemplates a vehicle driven by an electric motor. The motor should include a field winding arranged so that the vehicle is driven in a direction in accordance with the direction of direct current flowing through the field winding.

In accordance with the present invention, the electrical braking system is adapted to be carried by such a vehicle and includes a movable brake member which is adapted to be mounted to the vehicle for movement between a normal first position and a second position. Circuit means are provided for varying the amount of direct current applied to the field winding dependent upon the relative position of the brake member between the first and second positions. Sensing circuitry serves to determine whether the vehicle is traveling either in a first or a second of two opposite directions. Also, current direction control circuitry serves to control the direction of the direct current through the fielding winding so as to flow in a direction opposite to that for driving the vehicle in the sensed direction. In this manner, the electrical motor is electrically braked to thereby retard motion of the vehicle in the sensed direction substantially in proportion to the relative position of the brake member.

In accordance with a more limited aspect of the present invention, the current varying circuitry includes a variable resistor having a wiper arm mechanically coupled to the brake member for movement therewith.

Further, in accordance with the present invention, circuitry is provided for normally rendering the variable resistor deactivated and for activating the variable resistor when the brake member is displaced from its normal first position toward the second position.

Still further in accordance with the present invention, circuitry is provided for deactivating the current direction control circuitry upon the concurrent conditions that the vehicle is not moving, and the brake member is displaced from its first position toward its second position.

The invention also contemplates that the vehicle may be provided with a pulse control circuit for controlling application of direct current pulses to the electric motor's field winding. In such case, the invention may also include a pulse stretching circuit for increasing the width of the current pulses prior to application to the field winding to thereby obtain greater electrical braking forces for a given pulse frequency.

The primary object of the present invention is to provide an electrical braking system for obtaining smooth deceleration of an electric motor powered vehicle.

A further object of the present invention is to provide an electrical braking system having a movable brake member and control circuitry for decelerating both the electric motor and the vehicle powered thereby in accordance with the position of the brake member.

Another object of the present invention is to provide an electrical braking system which utilizes the electric motor of an electric motor driven vehicle for decelerating the vehicle.

A still further object of the present invention is to provide an electrical braking system for an electric motor driven vehicle having an electronic speed control circuit, and wherein the speed control circuit is utilized in electrically braking the vehicle.

A still further object of the present invention is to provide an electrical braking system particularly applicable for use in electrically braking an order picker vehicle.

The foregoing and other objects and advantages of the invention will be more readily apparent in light of the following description of the invention given in conjunction with the accompanying patent drawings wherein.

GENERAL DESCRIPTION

Figure 1:
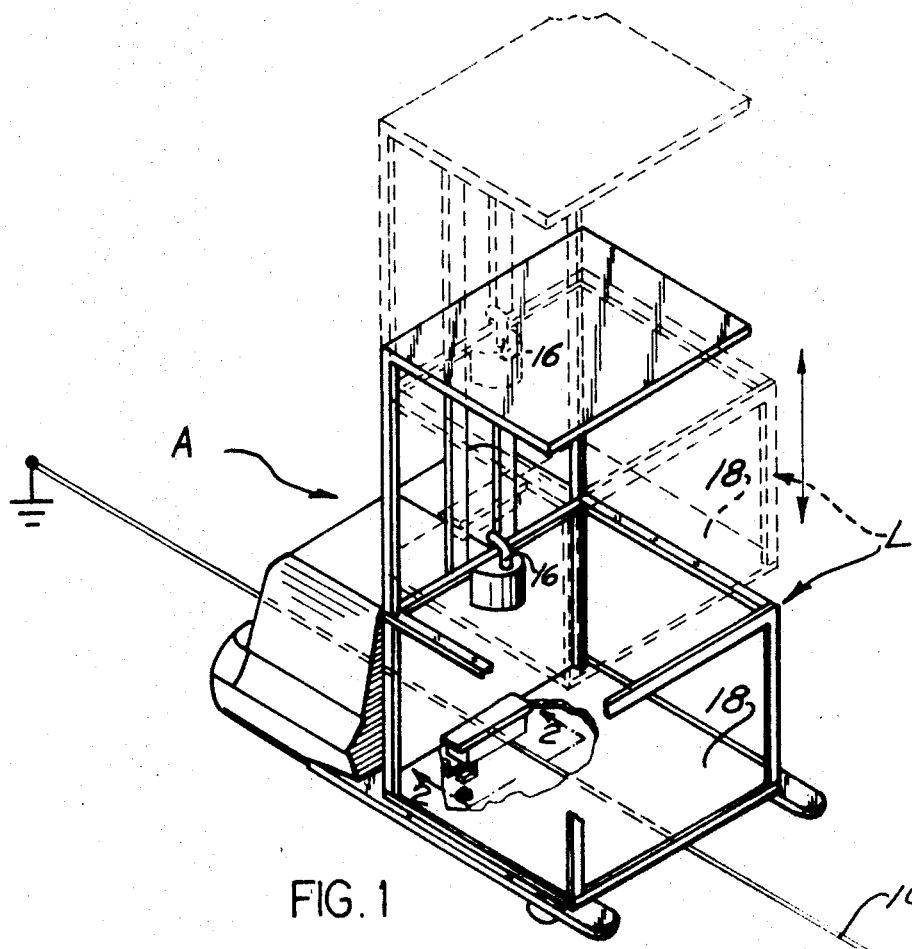
FIG. 1 is a perspective view illustrating an order picker vehicle.

Referring now to the drawings wherein the showings are for purposes of illustrating the preferred embodiment of the invention only, and not for the purpose of limiting same, FIG. 1 illustrates an order picker vehicle A having a lift L which is adjustably movable in a vertical direction between a lowermost floor position, shown by the solid lines in FIG. 1, and an upper position, shown by the dotted lines. The vehicle may have conventional steering mechanisms, but as shown in the drawings, includes steering circuitry for following a path defined by an alternating current energized cable 10. The steering forms no part of the present invention and, hence, will not be described in greater detail hereinafter. The lift L is raised or lowered by a suitable mechanism (not shown). A suitable handle grip 16 serves to control the speed of the electric motor which drives the vehicle. The operator stands on a platform 18.

Figure 2:
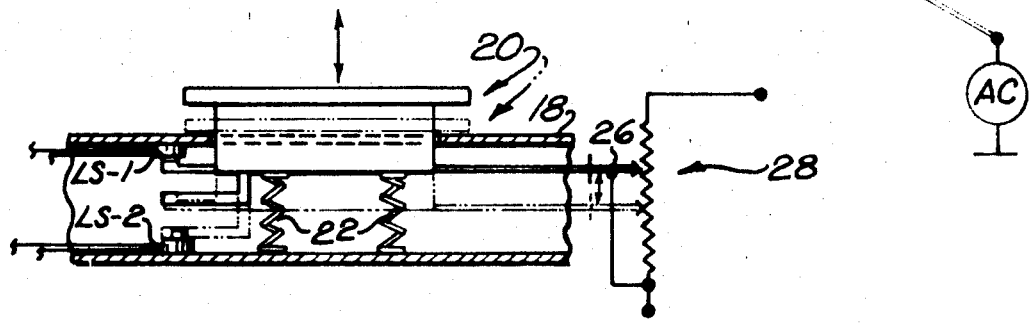
FIG. 2 is a view taken along line 2-2 in FIG. 1 and illustrating a brake member mounted to the vehicle for movement between a first position and a second position; and, FIGS. 3 and 3a, taken together, constitute a combined block-schematic diagram illustrating the electrical circuitry employed in the preferred embodiment of the invention.

In accordance with the present invention, a brake member 20 is mounted on platform 18 of lift L for movement between a normal first position, as shown by solid lines in FIG. 2, and a second position, as shown by the dotted lines. Brake member 20 is normally held in its first position as by use of compression springs 22. A normally open limit switch LS–1 is suitably mounted to the structure so that it is actuated to its closed condition once brake member 20 is slightly displaced from its normal first position toward its second position. Also, a normally closed limit switch LS–2 is suitably mounted to lift L so as to be actuated to its open position when brake member 20 is displaced to its second position. The purpose of limit switches LS–1, LS–2 will become more readily apparent from the description which follows, taken in conjunction with FIGS. 3 and 3a. Brake member 20 is mechanically coupled to the wiper arm 26 of a variable resistor, or potentiometer, 28 so as to vary the resistance thereof as the brake member 20 is displaced from its first position toward its second position.

Figure 3:
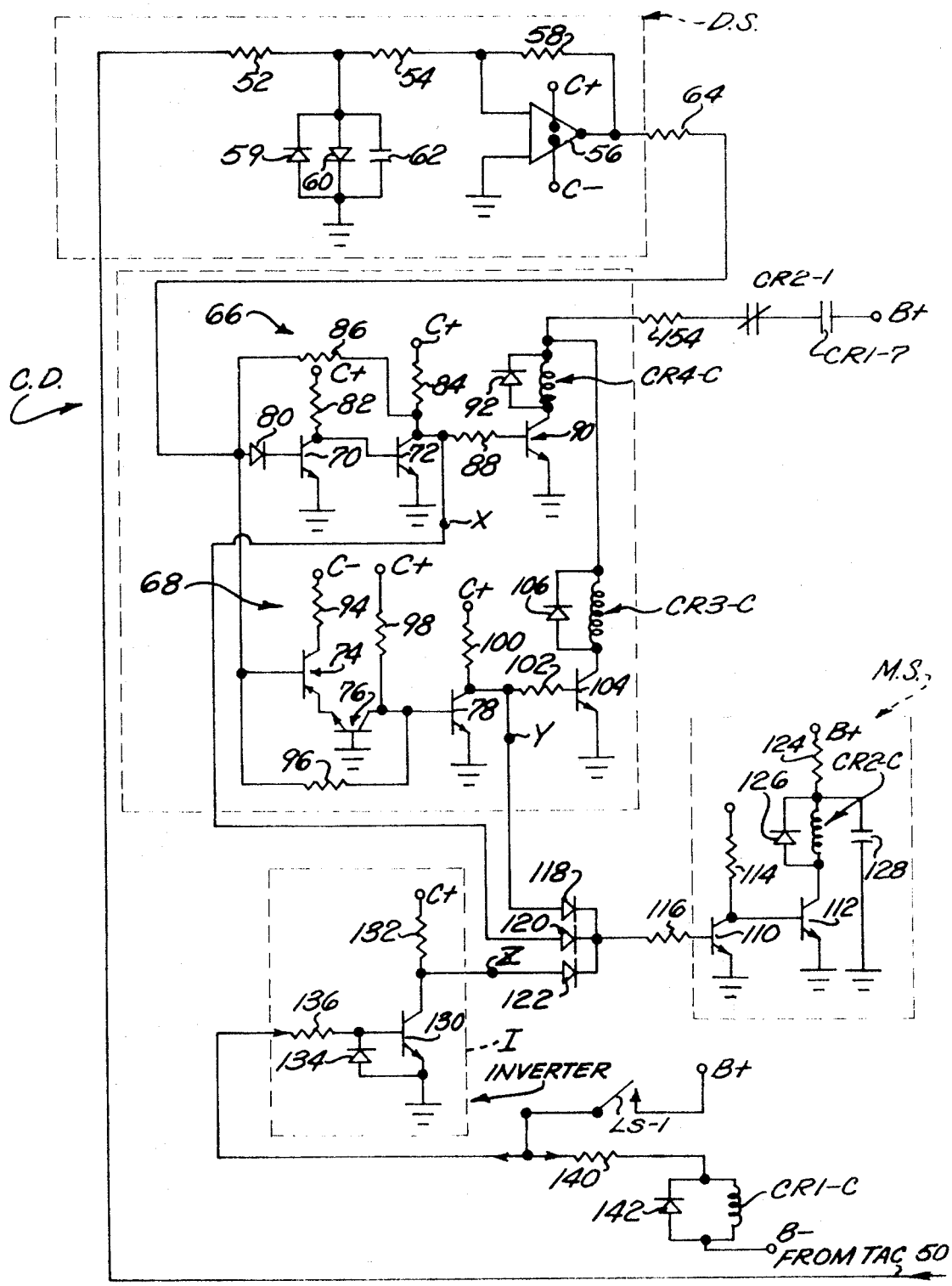
Figure 3A:
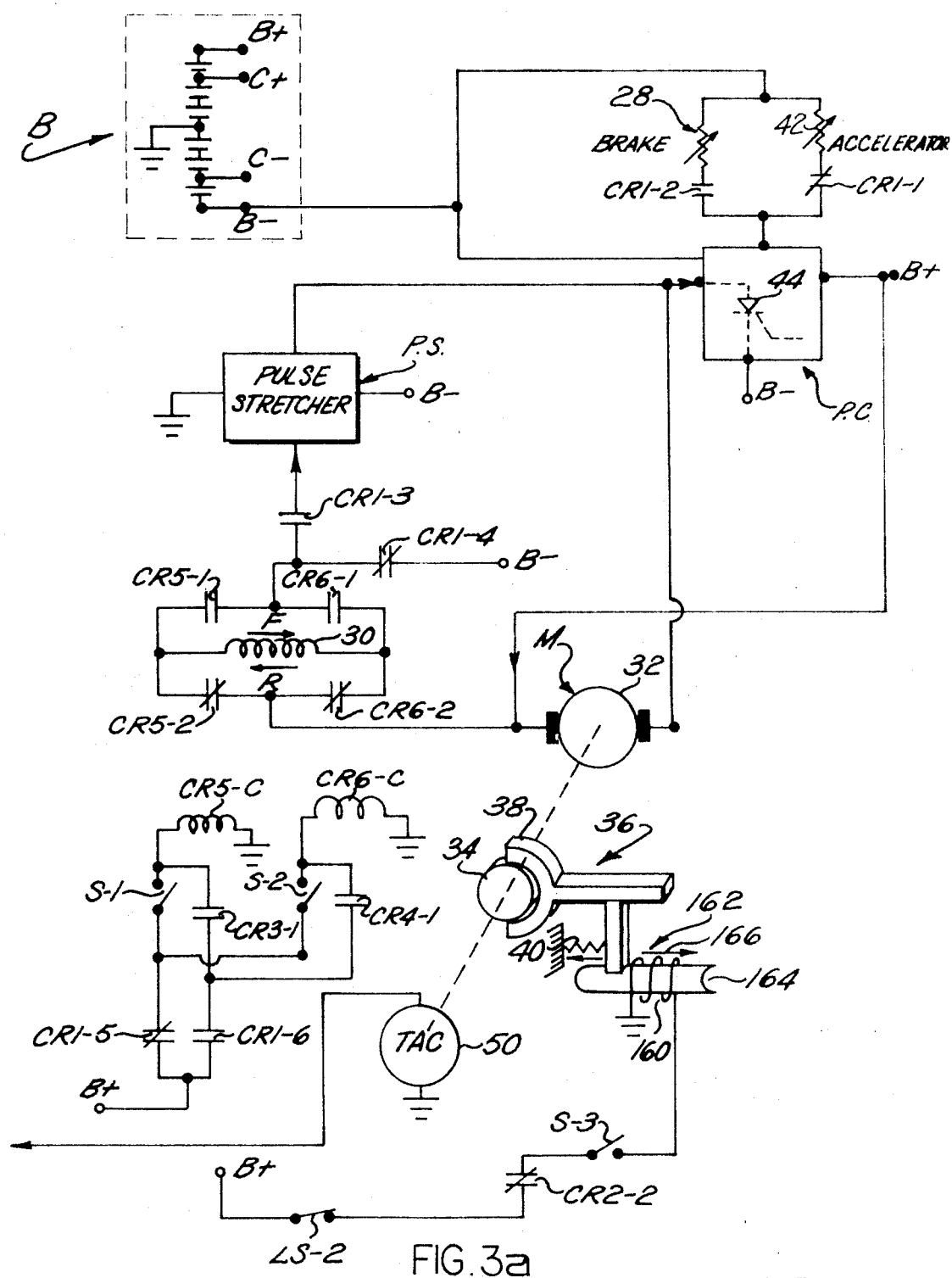

Reference is now made to FIGS. 3 and 3a, which provides a detailed illustration of the electrical braking system constructed in accordance with the present invention. As discussed hereinbefore, the invention contemplates that a vehicle be driven by an electric motor, such as motor M, having a shunt field winding 30 and an armature 32 for driving the vehicle's wheels, including a wheel generally designated as wheel 34. The vehicle is provided with a mechanical brake, such as brake 36, having a brake shoe 38 normally spring biased into engagement with wheel 34, as with a spring 40, to prevent vehicle movement. Brake 36 is illustrative of the typical on-off mechanical brake used in such a vehicle. Vehicles of this nature are frequently provided with a battery B made up of several small batteries so as to obtain B+, B−, C+ and C− voltages. The + and B− voltage levels may respectively be plus and minus 18 volts, and the C+ and C− voltages may be respectively plus and minus 12 volts. The B+ voltage is typically coupled to the armature 32 and through a pulse control circuit PC to the B− voltage supply source. The pulse control circuit PC serves to provide current pulses of a given polarity, magnitude, and pulse width to the armature 32 at a frequency dependent upon the value of a resistor connected between the B− voltage source and a control input of the pulse control circuit. The resistor connected to the control input of circuit PC takes the form of variable resistor 42, which normally serves as an accelerator control for controlling vehicle velocity. Pulse control circuit PC may take various forms and generally includes at least one silicon controlled rectifier 44, shown with dotted lines in FIG. 3a, together with appropriate control circuitry for controlling the frequency of firing pulses applied thereto. Preferably, the pulse control circuit takes the form of an electronic pulse control circuit available from General Electric Company as Model No. C185.

In accordance with the present invention, the electrical braking system includes a direction sensor circuit DS, which provides an output signal having a polarity indicative of vehicle direction and a magnitude indicative of vehicle speed. The output circuit of sensor circuit DS is coupled to a current direction control circuit CD, which, upon closure of limit switch LS–1 by brake member 20 (see FIG. 2), serves to control the direction of the direct current pulses taken from the output circuit of pulse control circuit PC through field winding 30 so that these pulses flow in a direction opposite to that required for driving the vehicle in the direction sensed by circuit DS. In this manner, the reverse current flowing through field winding 30 serves to electrically brake the electric motor and, hence, the vehicle driven by the motor. The rate of deceleration is dependent on the relative position of brake member 20. Having now presented a brief description of the invention, attention is directed to the following detailed description of the invention.

DIRECTION SENSOR CIRCUITRY

The direction-sensing circuit DS serves the purpose of providing an output signal indicative of the direction of vehicle travel, as well as vehicle velocity. This circuitry has its input coupled to the output of a DC tachometer 50 which is suitably coupled to the vehicle, such as to wheel 34, so as to provide an output signal having a polarity indicative of vehicle travel direction and a magnitude indicative of vehicle velocity. The output circuit of tachometer 50 is coupled through resistors 52 and 54 to one input of an operational amplifier 56. The operational amplifier has a feedback resistor 58 coupled between its output circuit and its input circuit. A second input circuit of operational amplifier 56 is coupled to ground. A pair of diodes 59 and 60 are connected together in parallel between the junction of resistors 52 and 54 and ground. As shown in FIG. 3, the diodes are oppositely poled with respect to each other. A capacitor 62 is connected in parallel with diodes 58 and 60 and a resistor 64 connects the output circuit of operational amplifier 56 with the input of current direction control circuit CD. If the vehicle is traveling in a forward direction, then the output signal of direction sensing circuit DS will be of negative polarity, and, conversely, if the vehicle is traveling in an opposite reverse direction the output signal will be of positive polarity.

CURRENT DIRECTION CONTROL CIRCUIT

The purpose of the current direction control circuit CD is to control the direction of current flow through field winding 30 during the electrical braking operation. If the vehicle is traveling in the reverse direction then circuit CD will cause the field current to flow through field winding 30 in a forward direction, as indicated by the arrow F adjacent winding 30 in FIG. 3a. Conversely, if the vehicle is traveling in a forward direction, then circuit CD will cause the field current to flow through winding 30 in a reverse direction, as indicated by arrow R.

The current direction control circuit CD includes a forward control circuit 68 and a reverse current control circuit 66. Circuit 66 includes a field current control means including relay coil CR4–C and a circuit including NPN transistors 70 and 72 for controlling energization of relay coil CR4–C. Similarly, forward control circuit 68 includes a field current control means in the form of relay coil CR3–C, together with circuitry including PNP transistor 74 and NPN transistors 76 and 78 for controlling energization of relay coil CR3–C.

The base of transistor 70 in control circuit 66 is coupled to the output of direction sensor circuit DS through resistor 70 and a diode 80, poled as shown. Transistors 70, 72 have their emitters coupled to ground and their collectors respectively connected through resistors 82 and 84 to the C+ voltage supply source. The collector of transistor 70 is connected to the base of transistor 72 and the collector of transistor 72 is connected through a resistor 86 to the base of transistor 70 through diode 80. The collector of transistor 72 is also connected through a resistor 88 to the base of an NPN transistor 90, having its emitter connected to ground and its collector connected in series circuit with relay coil CR4–C, which is connected in parallel with a diode 92, poled as shown.

PNP transistor 74 in circuit 68 has its base connected to the junction of diode 80 and resistor 86, and its collector connected through a resistor 94 to the C− voltage supply source. NPN transistor 76 has its emitter connected to the emitter of transistor 74 and its base connected to ground. The collector of transistor 76 is connected to the base of transistor 74 through a resistor 96, as well as to the C+ voltage supply source through a resistor 98. Transistor 78 has its base connected to the collector of transistor 76 and its emitter connected to ground. The collector of transistor 78 is connected through a resistor 100 to the C+ voltage supply source, as well as through a resistor 102 to the base of an NPN transistor 104. Transistor 104 has its emitter connected to ground and its collector connected in series with relay coil CR3–C, which is connected in parallel with a diode 106, poled as shown.

The reverse control circuit 66 has an output circuit X taken from the collector of transistor 72. Similarly, forward control circuit 68 has an output circuit Y taken from the collector of transistor 78. As will be appreciated from the description of operation presented hereinafter, when the vehicle is stationary, transistors 72 and 78 are conductive and, consequently, the potential existing at circuits X and Y is essentially that of ground potential.

MOTION SENSING CIRCUIT

The motion-sensing circuit MS, as shown in FIG. 3, generally includes a pair of NPN transistors 110 and 112, together with a switch control means in the form of relay coil CR2–C. Transistor 110 has its collector connected to the base of transistor 112 as well as through a resistor 114 to the C+ voltage supply source. The base of transistor 110 is connected through a resistor 116 to the output circuits X and Y in the current direction control circuit CD through respective diodes 118 and 120, poled as shown. The base of transistor 110 is also connected through resistor 116 to output circuit Z of an inverter circuit I through a diode 122, poled as shown. The potential existing at output circuit Z will be essentially that of ground potential whenever limit switch LS–1 is in its closed position, as upon actuation of brake member 20. Relay coil CR2–C is connected between the collector of transistor 112 and the B+ voltage supply source through a resistor 124. A diode 126, poled as shown, is connected in parallel with relay coil CR2–C, and a capacitor 128 is connected between ground and the junction of resistor 124 and relay coil CR2–C.

MISCELLANEOUS CIRCUITRY AND STRUCTURAL COMPONENTS

Normally open limit switch LS–1 is coupled between the B+ voltage supply source and inverter circuit I. The inverter circuit I includes an NPN transistor 130, having its emitter connected to ground and its collector connected to output circuit Z as well as through a resistor 132 to the C+ voltage supply source. A diode 134, poled as shown, is coupled between the base and emitter of the transistor. The base of transistor 130 is also connected through a resistor 136 to limit switch LS–1.

Limit switch LS–1 is also connected between the B+ voltage supply source and an electrical braking system mode control switching means in the form of relay coil CR1–C through a resistor 140. The other end of relay coil CR1–C is connected to the B– voltage supply source. A diode 142, poled as shown, is connected in parallel with the relay coil. Relay coil CR1–C serves to control the operation of various switches, in the form of relay contacts, including normally closed relay contacts CR1–1 for connecting an acceleration potentiometer 42 to the control input of pulse control circuit PC, as well as normally open relay contacts CR1–2 for coupling the electrical brake potentiometer 28 to the control input of pulse control circuit PC. Relay coil CR1–C also controls the operation of normally open relay contacts CR1–3 interposed between pulse stretcher PS and field winding 30, as well as normally closed relay contacts CR1–4 interposed between the B– voltage source and field winding 30.

It is contemplated that the invention use many of the components typically used with an electrical motor-driven vehicle. Consequently, vehicle A is provided with control circuitry for reversing field winding 30 with respect to the direction of current flowing from pulse control circuit PS. In the interests of simplifying the description of this invention, a simple relay control circuit is provided for this purpose. The circuit includes a pair of relays including relay coil CR5–C together with its normally open contacts CR5–1 and normally closed contacts CR5–2. The second relay includes relay coil CR6–C together with its normally open contacts CR6–1 and normally closed contacts CR6–2. These relay contacts are arranged about field winding 30, as shown in FIG. 3a. If direct current is to flow in the direction of arrow R, then relay coil CR5–C is energized, as by closing a normally open switch S–1 interposed between the coil and the B+ voltage supply source. If, on the other hand, current is to flow through field winding 30 in the forward direction, as indicated by arrow F, then coil CR6–C is energized as by closing a normally open switch S–2 interposed between relay coil CR6–C and the B+ voltage supply source.

In utilizing relay coils CR5–C and CR6–C, the present invention provides additional control circuitry, such as normally closed relay contacts CR1–5 and normally open contacts CR1–6. Relay contacts CR1–5 permit normally open switches S–1 and S–z to be effective during normal operation of the vehicle. Relay contacts CR1–6 are closed during the braking mode, when limit switch LS–1 is closed, so that the functions of switches S–1 and S–2 are performed by normally open relay contacts CR3–1 and CR4–1, respectively. These relay contacts, in turn, are controlled by relay coils CR3–C and CR4–C, respectively, located in the current direction control circuit CD.

The B+ voltage source is connected through normally closed relay contacts CR2–1, normally open contacts CR1–7 and resistor 154 to relay coils CR4–C and CR3–C. As will be described in greater detail hereinafter, once relay CR2–C is energized, which takes place upon the concurrent conditions that limit switch LS–1 is closed and that output circuits X and Y of current control circuit CD are at ground potential, then relay contacts CR2–1 will open so as to deactivate the current direction control circuit CD. This will prevent energization of relay coils CR4–C and CR3–C.

Typically, the electrically powered vehicles of the type described herein are provided with a deadman switch. The switch is normally in an open condition so that a mechanical brake, such as brake 36 shown in FIG. 3a, is resiliently biased into braking engagement with the vehicle's wheel 34. To obtain brake release, an operator must maintain the deadman switch closed. This may be accomplished in various forms and for purposes of simplifying the description of this invention, FIG. 3a illustrates a normally open deadman switch S–3 coupled between the B+ voltage supply source and the coil 160 of a solenoid 162. The solenoid may include a plunger 164, which, upon closure of deadman switch S–3, is driven in the direction indicated by the arrow 166 and, through suitable interconnection with brake shoe 38, serves to release the brake from engagement with wheel 34. In accordance with the present invention, it is contemplated that during the operation of the vehicle, the deadman switch S–3 be closed and, consequently, the brake is released. If brake member 20 is depressed to its second position, as shown by the dotted lines in FIG. 2, normally open limit switch LS–2 will be opened. The purpose of this switch is to cause brake 36 to engage wheel 34 once the switch is opened. Consequently, limit switch LS–2 is shown in FIG. 3 as being connected in series with deadman switch S–3 between the B+ voltage supply source and solenoid coil 160. It is also the purpose of the present invention to release brake 36 whenever the vehicle is motionless and brake member 20 is depressed. As previously described, under these conditions relay coil CR2–C becomes energized. To obtain this braking function, normally closed relay contacts CR2–2 are connected in the series circuit with limit switch LS–2 and deadman switch S–3.

OPERATION

During normal vehicle operation brake member 20 is in its normal position, as shown by the solid lines in FIG. 2, and consequently, limit switch LS–1 (see FIG. 3) is in its open position. Thus, relay coil CR1–C is not energized and accelerator potentiometer 42 is coupled to the control input of pulse control circuit PC for controlling the velocity of vehicle A. Vehicle direction control is accomplished by closing one of normally open switches S–2 or S–1 for controlling the current flowing through field winding 30 in a forward direction or reverse direction, respectively. If a deadman switch, such as switch S–3, is utilized by the vehicle, the switch will be in a closed condition and, consequently, solenoid 162 is energized to release mechanical brake 36.

If limit switch LS-1 is closed while the vehicle is in a stationary condition, then the potential existing at output circuits X, Y and Z will be essentially that of ground potential. Thus, upon closure of limit switch LS-1, transistor 130 is biased into conduction so that the potential existing at the collector thereof, and hence at output circuit Z, is essentially that of ground potential. Similarly, since the vehicle is stationary, transistor 70, in circuit 66, is reverse biased causing transistor 72 to be biased into conduction so that the potential at its collector, and hence at output circuit X, is at essentially ground potential. Also, with the vehicle in a stationary condition, transistors 74 and 76, in circuit 68, are reverse biased so that transistor 78 is biased into conduction and the potential existing at its collector, and hence on output circuit Y, is essentially at ground potential. With ground potential applied to the anodes of diodes 118, 120 and 122, transistor 110 in the motion sensing circuit MS is reverse biased so that transistor 112 is biased into conduction to energize relay coil CR2-C. When relay coil CR2-C is energized, its normally closed contacts CR2-1 are open to deactivate the current direction control circuit CD, and its normally closed contacts CR2-2 are also opened to thereby deenergize solenoid 162 so that brake 36 is biased into engagement with wheel 34 by spring 40. It will be noted from the circuitry of FIG. 3a that if power is lost from the B+ voltage supply source, solenoid 162 will be deenergized to actuate mechanical brake 36 into engagement with wheel 34.

If vehicle A is driven by motor M in either a forward or reverse direction and the operator actuates brake member 20 from its normal first position toward its second position, limit switch LS-1 will be closed to energize relay coil CR1-C. Consequently, all of the relay's normally open contacts will become closed and its normally closed contacts will become open. The pulse frequency of the current pulses provided by the pulse control circuit PC will be controlled by the adjustment of brake potentiometer 28 and these pulses will be stretched by pulse stretcher PS before application to field winding 30. As brake member 20 is further depressed toward its second position, the frequency of these pulses will increase and this will determine the speed of motor M. Also, the control for field winding 30 is switched to normally open relay contacts CR3-1 and CR4-1, and these relay contacts are, in turn, respectively controlled by circuits 68 and 66.

The direction of vehicle movement is sensed by tachometer 50 and direction sensing circuit DS. If the vehicle is traveling in a forward direction at the time the operator actuates brake member 20, then the output signal of direction sensing circuit DS will be of negative polarity. In such case, this signal will bias transistor 74 and, hence, transistor 76 of circuit 68, into conduction. With transistor 76 being biased into conduction, transistor 78 will be reverse biased, whereupon transistor 104 is biased into conduction. With transistor 104 biased into conduction, relay coil CR3-C will be energized, causing its normally open contacts CR3-1 to close. With contacts CR3-1 in a closed condition, relay coil CR5-C will be energized to close its normally open contacts CR5-1 and open its normally closed contacts CR5-2. Consequently, the direct current pulses from pulse stretcher PS will flow through field winding 30 in the reverse direction as indicated by arrow R. As the frequency of the pulses is increased, the dynamic braking action of motor M will be increased to decelerate the motor and, hence, vehicle A substantially in proportion to the position of brake member 20.

If in the above example, the vehicle was traveling in a reverse direction at the time the operator actuated brake member 20, then the output signal obtained from the direction sensing circuit DS would have been of positive polarity. In such case, the signal would forward bias transistor 70, in circuit 66, into conduction. Since the collector potential of transistor 70 will be essentially that of ground potential, transistor 72 will become reverse biased to thereby forward bias transistor 90 into conduction. With transistor 90 being forward biased into conduction, relay coil CR4-C will be energized to close its normally open contacts CR4-1 to, in turn, energize relay coil CR6-C. With relay coil CR6-C being energized, its normally open contacts CR6-1 will become closed and its normally closed contacts CR6-2 will become opened. Consequently, the current pulses from pulse stretcher PS will flow through field winding 30 in a forward direction, indicated by arrow F, and thereby dynamically brake motor M in proportion to the pulse frequency.

If, during the electrical braking operation, the operator requires a panic stop and depresses brake member 20 to its second position, limit switch LS-2 will be opened. This will deenergize solenoid 162 so that brake 36 is resiliently biased by spring 40 into braking engagement with wheel 34.

Although the invention has been described and shown in conjunction with a preferred embodiment, it will be readily apparent to those skilled in the art that various changes in form and arrangement of parts may be made to suit requirements without departing from the spirit and scope of the invention as defined by the appended claims.

Having thus described my invention, I claim:

1. An electrical braking system for a vehicle driven by an electric motor having a field winding arranged so that said vehicle is driven in a direction in accordance with the direction of direct current flowing through said field winding, said system adapted to be carried by a said vehicle and comprising:
    a movable brake member adapted to be mounted to a said vehicle for movement between a normal first position and a second position;
    means for varying the amount of direct current applied to said field winding in dependence upon the relative position of said brake member between said first and second positions;
    means for sensing whether said vehicle is traveling either in first or second opposite directions; and,
    current direction control means controlling the direction of said direct current through said field winding so as to flow in a direction opposite to that for driving said vehicle in the sensed direction, whereby said electrical motor is electrically braked to retard motion of said vehicle in said sensed direction substantially in proportion to said relative position of said brake member.

2. An electrical braking system as set forth in claim 1, wherein said current varying means includes a potentiometer having a wiper arm mechanically coupled to said brake member for movement therewith.

3. An electrical braking system as set forth in claim 2, including:
    first actuatable switching means having a normal first condition wherein said potentiometer is deactivated and a second condition wherein said potentiometer is activated; and,
    switch control means for, upon energization, actuating said first actuatable switching means to said second condition.

4. An electrical braking system as set forth in claim 3, including limit switch means having a normal first condition and a second condition, when said brake member is moved from its normal first position toward said second position, for energizing said control means.

5. An electrical braking system as set forth in claim 1, including actuatable switching means having a normal first condition for activating said current direction control means and a second condition for deactivating said current direction control means; and, switch control means for, upon energization, actuating said actuatable switching means to said second condition.

6. An electrical braking system as set forth in claim 5, including circuit means for energizing said switch control means only upon the concurrent conditions that said vehicle is not moving and said brake member is displaced from its first position toward said second position, whereupon said current direction control means becomes deactivated.

7. An electrical braking system as set forth in claim 6, including mechanical brake control means for, upon energization of said switch control means, controlling mechanical braking means to mechanically brake said vehicle.

8. An electrical braking system as set forth in claim 1, including switching means operated by said brake member for controlling mechanical braking means to mechanically brake said vehicle when said brake member is displaced to its second position.

9. An electrical braking system as set forth in claim 1, wherein said current direction control means includes a forward control circuit having first field current control means for, upon energization, controlling the direction of direct current flow in a forward direction through said field winding; and,
a reverse control circuit having a second field current control means for, upon energization, controlling the direction of said current flow in a reverse direction through said field winding.

10. An electrical braking system as set forth in claim 9, wherein said forward control circuit includes first circuit means for energizing said first field current control means when said vehicle is traveling in said second direction and said reverse control circuit includes second circuit means for energizing said second field current control means when said vehicle is traveling in said first direction.

11. An electrical braking system for a vehicle driven by an electric motor having a field winding arranged so that said motor may be driven in one of two opposite directions in accordance with the direction of direct current pulses flowing through said winding and at a velocity substantially proportional to the frequency of said pulses applied to said winding under the control of a pulse control circuit for changing said pulse frequency in dependence upon the value of a resistor coupled to an input of said circuit, said braking system adapted to be carried by said vehicle and comprising:
a variable resistor adapted to be coupled between a direct current voltage source and said circuit input for varying said pulse frequency;
a movable brake member adapted to be mounted to said vehicle for movement between a normal first position and a second position, said brake member being coupled to said variable resistor for changing the resistance thereof in accordance with the relative position of said member as it is being displaced from said first position to said second position and thereby vary said pulse frequency;
means for sensing whether said vehicle is traveling in either first or second opposite directions; and,
current direction control means controlled by said sensing means for controlling the direction of said current pulses through said field winding so as to flow in a direction opposite to that for driving said vehicle in said sensed direction, whereby said electric motor is electrically braked to retard motion of said vehicle in said sensed direction in accordance with said relative position of said brake member.

12. An electrical braking system as set forth in claim 11, including pulse stretcher means for increasing the pulse width of said current pulses applied to said field winding to obtain greater electrical braking forces for a given pulse frequency.

13. An electrical braking system as set forth in claim 12, including actuatable switching means having a normal first condition wherein said pulse stretcher means is deactivated and a second condition wherein said pulse stretcher means is activated; and
switch control means for, upon energization, actuating said actuatable switching means to said second condition.

14. An electrical braking system as set forth in claim 13, including limit switch means having a normal first condition and a second condition, when said brake member is moved from its normal first position toward said second position, for energizing said switch control means and, hence, activating said pulse stretcher means.

15. An electrical braking system as set forth in claim 11, wherein said variable resistor has a wiper arm coupled to said brake member for movement therewith to vary the resistance of said variable resistor.

16. In an order picker vehicle driven by a direct current operated electric motor having a field winding, said vehicle having a lift vertically movable between lower and upper positions, said lift having means for supporting an operator together with manually operable controls for controlling lift height and vehicle speed, the improvement for electrically braking said vehicle comprising:
a manually movable brake member mounted to said lift for movement relative to said lift between a normal first position and a second position;
means for varying the amount of direct current applied to said field winding in dependence upon the relative position of said brake member between said first and second positions;
vehicle direction sensing means for sensing whether said vehicle is traveling in a forward or reverse direction; and,
motor current control circuit means controlled by said direction sensing means for reversing the direction of direct current flowing through said field winding to dynamically brake said motor and thereby retard motion of said vehicle in said sensed direction with a braking force dependent on the relative position of said brake member between its said first and second positions.

17. In an order picker vehicle as set forth in claim 16, wherein said current varying means includes a variable resistor having a wiper arm coupled to said brake member for movement therewith.

18. In an order picker vehicle as set forth in claim 16, including first limit switch means mounted to said lift so as to be actuated by said brake member only when said brake member is displaced from its first position toward said second position, and
circuit control means for deactivating said motor current control circuit means only upon the concurrent conditions that said first limit switch means is actuated and said vehicle is stationary.

19. In an order picker vehicle as set forth in claim 16, wherein said vehicle has actuatable mechanical braking means and said improvement further includes:
second limit switch means mounted to said lift so as to be actuated when said brake member is displaced to its second position for, in turn, actuating said mechanical braking means.